US011244157B2

(12) United States Patent
Xiong et al.

(10) Patent No.: US 11,244,157 B2
(45) Date of Patent: Feb. 8, 2022

(54) IMAGE DETECTION METHOD, APPARATUS, DEVICE AND STORAGE MEDIUM

(71) Applicant: BAIDU ONLINE NETWORK TECHNOLOGY (BEIJING) CO., LTD., Beijing (CN)

(72) Inventors: Junfeng Xiong, Beijing (CN); Yang Wang, Beijing (CN); Yan Liu, Beijing (CN); Xin Hao, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/879,342

(22) Filed: May 20, 2020

(65) Prior Publication Data
US 2021/0004587 A1 Jan. 7, 2021

(30) Foreign Application Priority Data
Jul. 5, 2019 (CN) .......................... 201910606028.2

(51) Int. Cl.
G06K 9/00 (2006.01)
G06K 9/46 (2006.01)
(Continued)

(52) U.S. Cl.
CPC ..... *G06K 9/00577* (2013.01); *G06K 9/00248* (2013.01); *G06K 9/00281* (2013.01); *G06K 9/4609* (2013.01); *G06K 9/6256* (2013.01)

(58) Field of Classification Search
None
See application file for complete search history.

(56) References Cited

U.S. PATENT DOCUMENTS 10,819,881 B1 * 10/2020 Smolyar ............... H04L 9/3236
2017/0109600 A1 * 4/2017 Voloshynovskiy ........................
G06K 9/00577
(Continued)

FOREIGN PATENT DOCUMENTS

CN 107578404 A * 1/2018
CN 107633204 A 1/2018
(Continued)

OTHER PUBLICATIONS

Chinese Patent Application No. 201910606028.2 Office Action dated Jun. 24, 2021, 11 pages.
(Continued)

*Primary Examiner* — Mohammed Rachedine
(74) *Attorney, Agent, or Firm* — Lathrop GPM LLP

(57) ABSTRACT

Example embodiments of the present disclosure provide an image detection method, an electronic device and a computer-readable storage medium. The image detection method includes the following. Am image to be detected including a target object is obtained and multiple feature representation determination modules are obtained. The multiple feature representation determination modules are trained for different parts of a reference object, using a reference image including the reference object and an authenticity of the reference image. Multiple feature representations for different parts of the target object are determined based on the image to be detected and the multiple feature representation determination modules. An authenticity of the image to be detected is determined based on the multiple feature representations.

20 Claims, 5 Drawing Sheets

(51) Int. Cl.
*G06K 9/62* (2006.01)
*G06T 7/00* (2017.01)

(56) References Cited

U.S. PATENT DOCUMENTS

| | | | | |
|---|---|---|---|---|
| 2017/0364635 A1* | 12/2017 | Kobayashi | ............ | G16H 30/40 |
| 2018/0322364 A1* | 11/2018 | Nagato | ................ | G06K 9/6202 |
| 2019/0066292 A1* | 2/2019 | Pomeranz | ............. | G06T 7/0008 |
| 2019/0246061 A1* | 8/2019 | Yu | ........................... | G09G 5/10 |
| 2020/0285901 A1* | 9/2020 | Hiasa | ...................... | G06K 9/40 |

FOREIGN PATENT DOCUMENTS

| | | | |
|---|---|---|---|
| CN | 107633207 A | 1/2018 | |
| CN | 109711273 A | 5/2019 | |
| CN | 109858439 A | 6/2019 | |
| WO | WO-2020204150 A1 * | 10/2020 | ......... G06K 9/00221 |

OTHER PUBLICATIONS

Chinese Patent Application No. 201910606028.2 English translation of Office Action dated Jun. 24, 2021, 10 pages.
Chinese Patent Application No. 201910606028.2 Office Action dated Nov. 5, 2021, 11 pages.
Chinese Patent Application No. 201910606028.2 English translation of Office Action dated Nov. 5, 2021, 14 pages.

* cited by examiner

IMAGE DETECTION METHOD, APPARATUS, DEVICE AND STORAGE MEDIUM

CROSS REFERENCE TO RELATED APPLICATIONS

This application claims priority to and benefits of Chinese Application No. 201910606028.2, filed on Jul. 5, 2019, the entire content of which is incorporated herein by reference.

FIELD

Embodiments of the present disclosure mainly relate to a field of computers, and more particularly, to an image detection method and apparatus, a device and a computer-readable storage medium.

BACKGROUND

Photos and videos have been increasingly involved in people's lives and work. In recent years, with the development of image generation technology based on deep learning, artificial intelligence algorithms have been used to automatically synthesize images in large quantities, such as generating fake faces and videos.

SUMMARY

A method for detecting an image is provided. The method includes acquiring an image to be detected including a target object and multiple feature representation determination models. The multiple feature representation determination models are trained for different parts of a reference object, using a reference image including the reference object and an authenticity of the reference image. The method also includes determining multiple feature representations for different parts of the target object based on the image to be detected and the multiple feature representation determination models. The method further includes determining an authenticity of the image to be detected based on the multiple feature representations.

An electronic device is provided. The electronic device includes one or more processors; and a storage device, configured to store one or more programs. When the one or more programs are executed by the one or more processors, the one or more processors are caused to implement the method described above.

A computer-readable storage medium is provided. A computer program is stored on the storage medium. When the program is executed by a processor, the program is configured to implement the method described above.

It should be understood that the Summary is not intended to limit key or important features of the embodiments of the present disclosure, nor is it intended to limit the scope of the present disclosure. Other features of the present disclosure will become readily understood from the following description.

BRIEF DESCRIPTION OF THE DRAWINGS

The above and other features, advantages, and aspects of the embodiments of the present disclosure will become more apparent with reference to the accompanying drawings and the following detailed description. In the drawings, the same or similar reference numerals indicate the same or similar elements.

DETAILED DESCRIPTION

Figure 1:
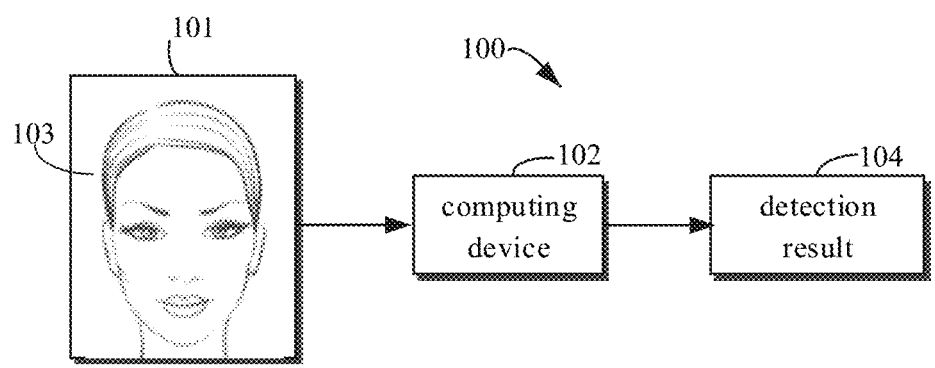
FIG. 1 is a schematic diagram illustrating an exemplary environment for implementing various embodiments of the present disclosure.

Embodiments of the present disclosure will be described in more detail below with reference to the accompanying drawings. While certain embodiments of the present disclosure have been illustrated in the accompanying drawings, it is to be understood that the present disclosure may be embodied in various forms and should not be construed as being limited to the embodiments set forth herein. Instead, these embodiments are provided for a thorough and complete understanding of the present disclosure. It should be understood that the drawings and embodiments of the present disclosure are for illustrative purposes only and are not intended to limit the scope of the present disclosure.

In the description of the embodiments of the present disclosure, the term "include" and its equivalents should be construed as open-ended inclusions, i.e., "include, but is not limited to". The term "according to" is to be understood as "at least partially according to". The term "an embodiment" or "the embodiment" should be understood as "at least one embodiment". Terms "first", "second" and the like may refer to different or identical objects. Other explicit and implicit definitions may also be included below.

Although conventional technologies based on manual face image modifications are delicate, these technologies cannot generate a large number of fake images or videos due to limitations on effort, time and cost. However, based on autoencoders, face fake technology based on deep learning compared with generation network, has already been able to produce a large number of face-changing videos.

As mentioned above, a case that images are synthesized to generate fake images or videos in large quantities exists. To identify these fake images or videos, several solutions have been provided, including end-to-end convolutional neural networks (CNN), CNN-based representation learning and classifiers, and conventional image processing methods such as a method for extracting noise features and LDA features, applying various filtering algorithms, etc., and using traditional classifiers. According to the unit of information utilization, these solutions may be divided into single-frame detection and multi-frame detection.

In existing solutions, most of the CNN-based recognition technologies uses only some of image information. For example, when an image is input to the CNN-based recognition model, it needs to adjust the image to a specified size, for example in most cases, the size of the image is reduced, resulting in that many detailed features of the image are missed by an interpolation algorithm before the image is inputted to the CNN-based recognition model. An disadvantage of directly using the entire image information is that it is difficult to accurately align images due to differences amongst various individuals for each part of an object, such as a human face, which causes an interference on subtle tasks, such as identifying fake images or videos.

On the other hand, although conventional methods are interpretable, a method for recognizing fake images and videos based on deep learning is not interpretable. For example, the method for recognizing fake images and videos based on deep learning cannot identify which part or parts of the human face show(s) a fake or synthesis indication, which may be detrimental to digital evidence identification and judicial-related work. Therefore, it is necessary to find a solution to use more information included in the image as possible and improve the interpretability of the model.

According to embodiments of the present disclosure, a solution for image detection is proposed. In this solution, multiple feature representation determination models trained in advance for different parts of an object may be used to determine multiple feature representations of different parts of a target object included in an image to be detected. Authenticity of the image to be detected may be determined based on the feature representations of the different parts. In this manner, more information of the image to be detected may be utilized by comprehensively taking the different parts of the target object into account, thereby reducing the compression of the image to be detected and improving the accuracy of a detection result. Therefore, the solution of the present disclosure may advantageously realize automatic, effective, and low-cost detection of a synthesized image or a fake image.

Hereinafter, embodiments of the present disclosure will be described in detail with reference to the accompanying drawings.

FIG. 1 is a schematic diagram illustrating an example environment 100 for implementing various embodiments of the present disclosure. In this example environment 100, a detection result 104 may be generated by a computing device 102 for an image 101 (hereinafter referred to as an image 101 to be detected). It should be understood that the environment 100 illustrated in FIG. 1 is merely exemplary, and multiple computing devices may be used to generate the detection result 104.

The computing device 102 may be any device having a computing capability. As a non-limiting example, the computing device 102 may be any type of fixed computing device, mobile computing device, or portable computing device, including but not limited to a desktop computer, a laptop computer, a notebook computer, a netbook computer, a tablet computer, a multimedia computer, a mobile phone, and so on. All or some of components of the computing device 102 may be arranged at a cloud end.

The image 101 to be detected may include a target object 103. The image 101 to be detected may be a single picture or a frame of a video. The image 101 to be detected may also be a part, including the target object 103, extracted from the single picture or the frame of the video. Embodiments of the present disclosure are not limited in this regard.

Although the target object 103 illustrated in FIG. 1 is a human face and embodiments of the present disclosure are described below with the case that the human face is the target object, the above is merely an example. Embodiments of the present disclosure may also be applied to an image including an object of another type, such as an image about animals. In addition, although the example of FIG. 1 illustrates that the image 101 to be detected includes only one target object 103, it should be understood that the image 101 to be detected may include multiple objects (for example, multiple faces). An image detection process according to embodiments of the present disclosure may be performed on one or more of the multiple objects.

In such a picture or video, the target object 103 such as the human face may be a synthesized human face generated through, for example, artificial intelligence technology or by making modifications on a real human face image. After the image 101 to be detected is acquired, the detection result 104 may be provided for the image 101, using the solution for image detection according to the present disclosure described in detail below. The detection result 104 may include a determination whether the image 101 is a real image or a synthesized image (is generated by synthesis), or a probability that the image 101 is a synthesized image. In some embodiments, the detection result 104 may further include additional information, such as synthesis location or fake indication. For example, the detection result 104 may also indicate that the nose of the target object 101 is generated by synthesis, or that the probability that the nose of the target object 101 is fake is high.

Figure 2:
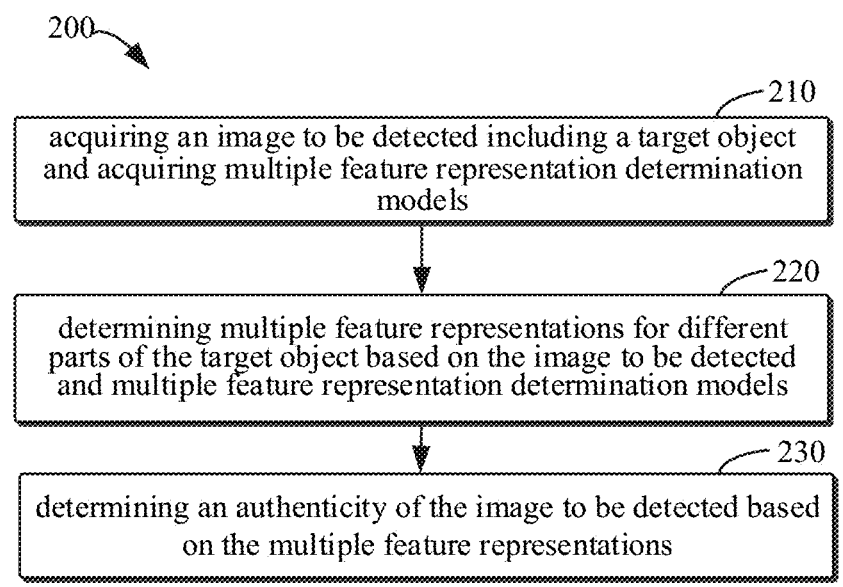
FIG. 2 is a flowchart illustrating an image detection according to some embodiments of the present disclosure.

In order to clearly understand the solution of image detection according to embodiments of the present disclosure, the embodiments of the present disclosure will be further described with reference to FIG. 2. FIG. 2 is a flowchart illustrating an image detection method 200 according to embodiments of the present disclosure. The method 200 may be implemented by the computing device 102 of FIG. 1. For ease of discussion, the method 200 will be described in combination with FIG. 1.

At block 210, the computing device 102 is configured to acquire the image 101 to be detected including the target object 103 and acquire multiple feature representation determination models. The multiple feature representation determination models may be trained for different parts of a reference object by using the reference image including a reference object and an authenticity of the reference image. As described above, the image 101 to be detected may be a frame of a video. The target object 103 may be, for example, a human face. For example, the computing device 102 may be configured to extract a human face image from the frame of the video through face recognition technology, as the image 101 to be detected.

The multiple feature representation determination models may be trained in advance for different parts of the reference object. In the case where the target object 103 is the human face, there may be multiple reference images, i.e., human face images. Some of these human face images are generated by synthesis, and others are real. These feature representation determination models may correspond to respective parts of the target object 103. For example, there may be n feature representation determination models corresponding to n parts respectively. That is, the n feature representation determination models are respectively used to determine the feature representations for the n different parts.

Figure 3:
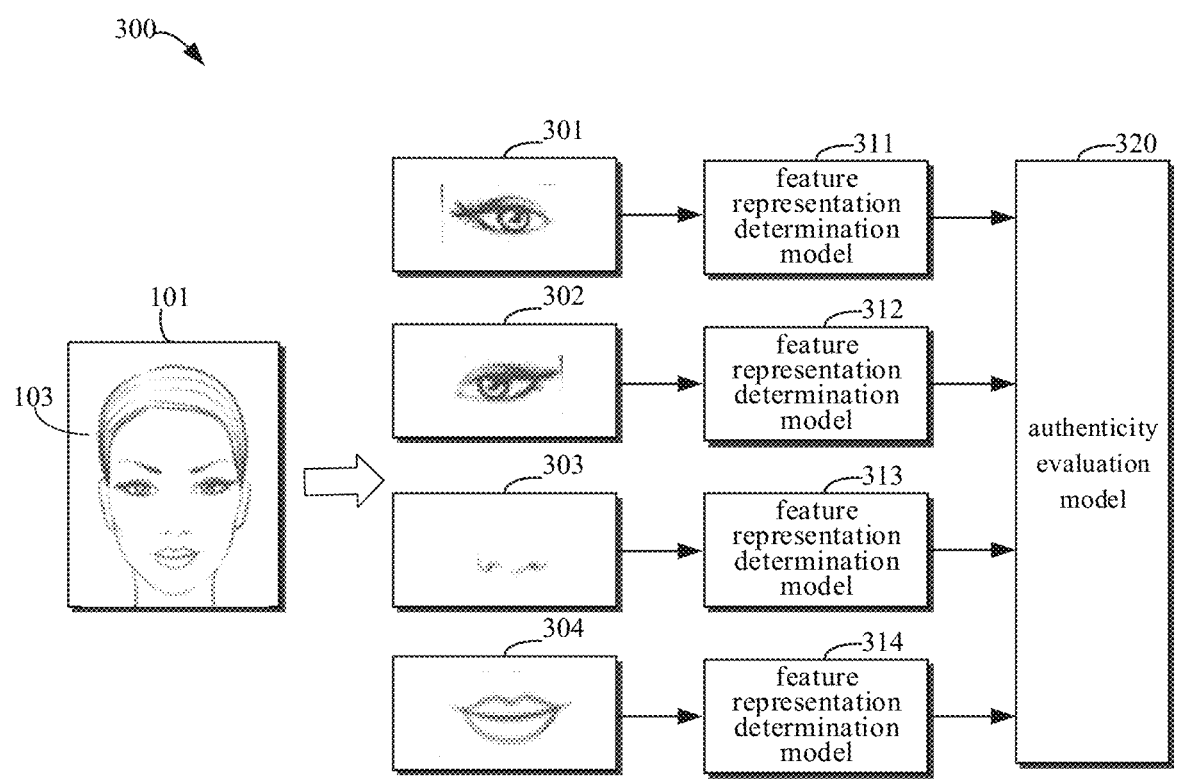
FIG. 3 is a schematic block diagram illustrating an architecture of image detection according to some embodiments of the present disclosure.

In the case where the target object 103 is a human face, these feature representation determination models may respectively correspond to different parts of the human face, such as the left eye, the right eye, the nose, ears, the mouth, and the like. As illustrated in FIG. 3, FIG. 3 is a schematic block diagram illustrating an architecture 300 of image detection according to some embodiments of the present disclosure. In the example of FIG. 3, the feature representation determination models 311-314 may correspond to the right eye, the left eye, the nose, and the mouth of the human face, respectively. That is, in this example, the feature representation determination models 311-314 may be configured to determine the feature representations of the right eye, the left eye, the nose, and the mouth of the human face in an image to be detected, respectively.

In some embodiments, the feature representation determination models 311-314 may be based on neural network, such as a CNN-based model. In the present disclosure, the "neural network" may be referred to as "neural network-based model", "learning network", "learning model", "network", or "model". The above terms may be used interchangeably herein. The neural network may be a multi-layer processing model that has one or more layers composed of non-linear units, for processing received inputs to produce corresponding outputs. Some neural networks may include one or more hidden layers and an output layer. The output of each hidden layer may be used as an input of a next layer (i.e., a next hidden layer or the output layer) in the neural network. Each layer of the neural network may be configured to process the input according to values of a set of predetermined parameters to generate a corresponding output. The values of the set of parameters of each layer in the neural network may be determined through a training process.

Referring to FIG. 2, at block 220, the computing device 102 may be configured to determine multiple feature representations for the different parts of the target object based on the image 101 to be detected and the multiple feature representation determination models. For example, the computing device 102 may be configured to utilize the feature representation determination models 311-312 to determine the feature representations of the right eye, the left eye, the nose, and the mouth of the target object 103, respectively. The feature representation of each part may be, for example, in a form of vector.

In order to determine the feature representations for different parts, the computing device 102 may be configured to determine positions of the different parts of the target object 103 in the image 101 to be detected. When the image 101 to be detected is an image having a predetermined size or a standard size, such as a certificate photo having a predetermined size, the different parts may be positioned by dividing the image 101 to be detected in a predetermined manner.

In some embodiments, the computing device 102 may be configured to locate the different parts of the target object 103 based on key point detection. The computing device 102 may be configured to determine multiple sets of key points associated with the different parts of the image 101 to be detected, and determine multiple feature representations for the different parts based on the multiple sets of key points and the multiple feature representation determination models. Each set of key points may include one or more predetermined points associated with the corresponding part.

For example, in the example of FIG. 3, the computing device 102 may be configured to determine, from the image 101 to be detected, a set of key points associated with the right eye, a set of key points associated with the left eye, a set of key points associated with the nose, and a set of key points associated with the mouth, respectively. Face key point positioning or detection may be performed by using a method such as multi-task cascaded convolutional network (MTCNN), Dlib, and so on. Embodiments of the present disclosure are not limited in this regard.

In some embodiments, after the set of key points is determined, image data corresponding to an area where the set of key points is located may be directly extracted and applied to a corresponding feature representation determination model to determine the feature representation of the corresponding part. For example, the image data corresponding to the area where the set of key points associated with the left eye is located may be extracted and applied to the feature representation determination model 312 to determine the feature representation of the left eye of the target object 103.

In some embodiments, after the set of key points is determined, an intermediate image may be generated based on the set of key points, and applied to the feature representation determination model. For example, the computing device 102 may be configured to determine, from the image 101 to be detected, an area where one of the multiple sets of key points is located and generate the intermediate image based on the area determined. The computing device 102 may be configured to determine the feature representation of the part corresponding to the set of key points, by applying the intermediate image to the feature representation determination model corresponding to the set of key points.

One example will be described in detail with reference to FIG. 3 to determine the feature representation of the mouth of the target object 103. After key-point-based position or detection, the area where one or more key points associated with the mouth of the target object 103 are located may be determined from the image 101 to be detected. The computing device 102 may be configured to generate the intermediate image 304 to be inputted to the feature representation determination model 314, based on the area where the mouth is located. For example, the area where the mouth is located may be determined using a method for highlighting a part and blurring other parts, i.e., highlighting the area where the mouth is located and blurring the other areas in the image 101 to be detected. Additionally, an image obtained through the above processes may be enlarged to a specified size.

In generating the intermediate image 304, an alignment process may be performed, for example placing the highlighted area at the center of the generated intermediate image. Regarding to other parts, the image 101 to be detected may be processed in the same manner to generate an intermediate image 301 corresponding to the right eye, an intermediate image 302 corresponding to the left eye, and an intermediate image 303 corresponding to the nose. The computing device 102 may be configured to apply the intermediate images 301-304 to the feature representation determination models 311-314, respectively, to determine the feature representations of the right eye, the left eye, the nose, and the mouth of the target object 103.

In an embodiment, with the key-point-based position or detection, different parts of the target object may be accurately located, which is helpful for accurately evaluating the authenticity of the image to be detected.

It should be understood that a manner for generating the intermediate image described above with reference to FIG. 3 should be consistent with a manner for generating the intermediate reference image (see the description below) during the training of the feature representation determination models 311-314. It should also be understood that the intermediate images and the number of feature representation determination models illustrated in FIG. 3 are only examples, and are not intended to limit the scope of the present disclosure. In embodiments of the present disclosure, an appropriate number of feature representation determination models may be selected as needed.

Referring to FIG. 2, at block 230, the computing device 102 may be configured to determine the authenticity of the image 101 to be detected based on the multiple feature representations determined at the block 220. The computing device 102 may be configured to determine that the image 101 to be detected is a synthesized image. For example, the computing device 102 may determine that the target object 103 is a synthesized human face. The computing device 102 may be configured to further determine the probability that the image 101 to be detected is the synthesized image. In some embodiments, the computing device 102 may combine the multiple determined feature representations using a predetermined relationship, thereby determining the probability that the image 101 to be detected is the synthesized image. For example, in the case where the feature representation is in the form of vector, for each feature representation, the computing device 102 may be configured to obtain a weighted result of each feature representation by weighting each component of the feature representation, and combine the weighted result of each feature representations.

In some embodiments, the computing device 102 may be configured to determine the authenticity of the image 101 to be detected 101 applying the multiple determined feature representations to an authenticity evaluation model. Referring to FIG. 3, the authenticity evaluation model 320 is illustrated. In the example of FIG. 3, the feature representations of the right eye, the left eye, the nose, and the mouth of the target object 103 are applied to the authenticity evaluation model 320 (also called as a decision model) to determine whether the target object 103 is a real face or a synthesized face (for example, a fake face).

The authenticity evaluation model 320 may be a model based on neural network, decision tree, random forest, logistic regression, and the like. The authenticity evaluation model 320 may be trained along with the multiple feature representation determination models 311-314, using the reference images and the authenticity of the reference images.

In embodiments of the present disclosure, the target object in the image to be detected is divided into different parts, and the feature representations of the different parts are taken into account to determine the authenticity of the image to be detected. In this manner, it is possible to reduce the compression of the image to be detected, and better utilize information of the image to be detected.

In some embodiments, at block 230, the computing device 102 may be further configured to determine which part or parts of the target object 103 is/are likely to be synthesized, that is, locate a fake indication. For example, the computing device 102 may be configured to determine an authenticity score for a part corresponding to each of the multiple feature representations. If the authenticity score of the part corresponding to a certain feature representation is lower than a predetermined threshold, it may be determined that the part corresponding to the certain feature representation is generated by synthesis or has a high probability that the part is generated by synthesis. For example, the computing device 102 may determine authenticity scores of the right eye, the left eye, the nose, and the mouth of the target object 103. In an example, in the case that the authenticity score of the nose is lower than the predetermined threshold, it may be considered that the noise is generated by synthesis, and the computing device 102 may provide information regarding this in the detection result 104.

Different authenticity score metrics may be adopted according to specific implementations of the authenticity evaluation model 320. For example, in the case where the authenticity evaluation model 320 is based on the neural network, the authenticity score or the authenticity metric may be a weighted result of elements corresponding to the feature representation of the corresponding part in a certain layer of the neural network, or may be a value of an element corresponding to the feature representation of the corresponding part in a previous layer of the output layer. For example, after being converted by the authenticity evaluation model 320, elements of the feature representation of the right eye in a certain layer may be a, b and c. The authenticity of the right eye may be evaluated by weighting a, b, and c to determine whether the right eye is synthesized.

In embodiments, since local features of the different parts of the target object are utilized separately, instead of utilizing overall information of the entire image to be detected, it is possible to provide fake analysis on the different parts. In this manner, the fake indications may be located, which is beneficial for digital evidence identification and judicial-related work.

Figure 4:
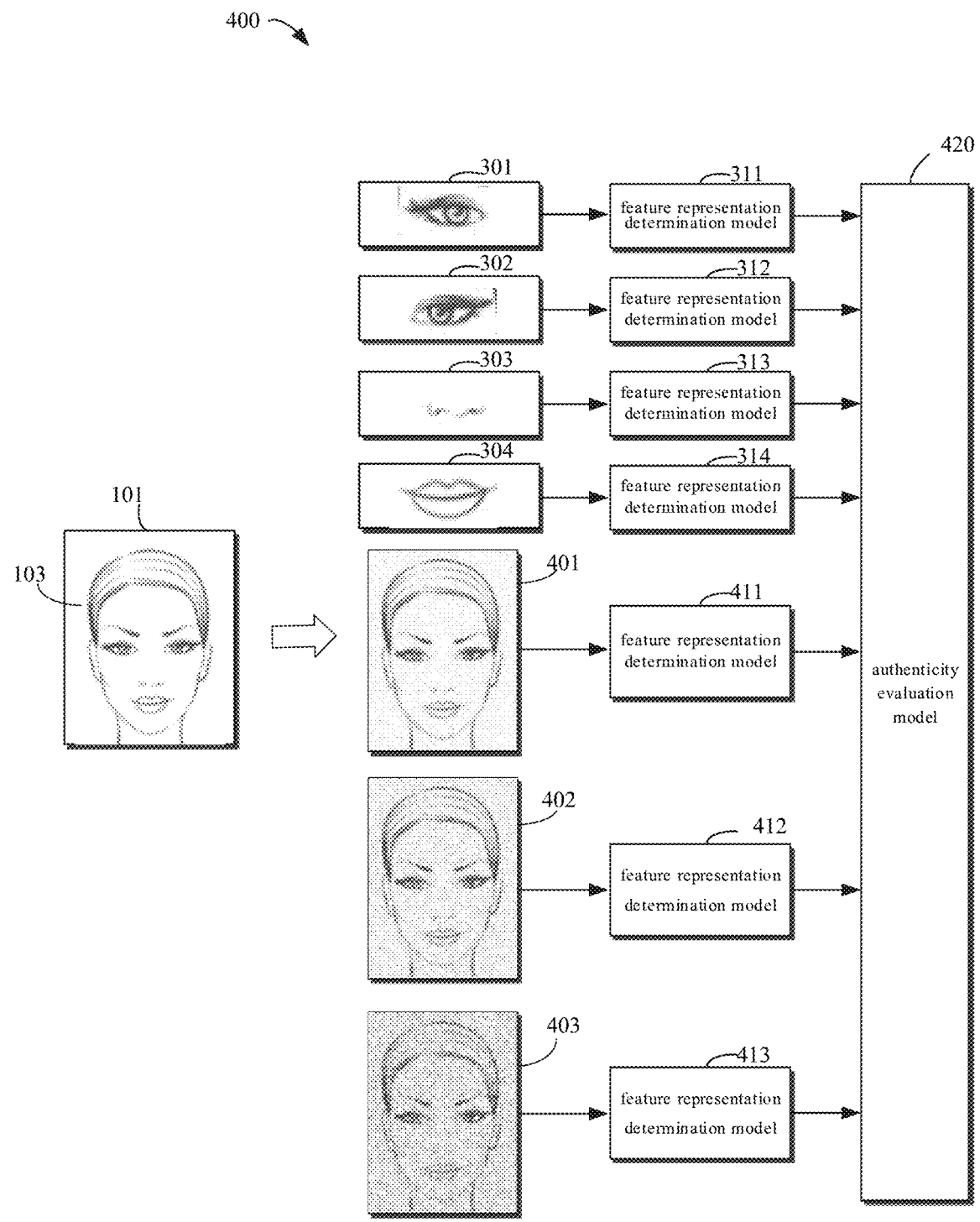
FIG. 4 is a schematic block diagram illustrating an architecture of image detection according to some embodiments of the present disclosure.

In some embodiments, filtering processing such as noise extraction may be performed on the image 101 to be detected. The authenticity of the image 101 to be detected may be determined based on the image subjected to the filtering processing in combination with the above local images. In the following, some embodiments will be described with reference to FIG. 4. FIG. 4 is a schematic block diagram illustrating an architecture 400 of image detection according to some embodiments of the present disclosure.

The computing device 102 may be configured to generate at least one filtered image by applying at least one filter to the image to be detected. The computing device 102 may be configured to determine an additional feature representation for the image to be detected based on the at least one filtered image and an additional feature representation determination model. The additional feature representation determination model may be trained for the at least one filter by using the reference image and the authenticity of the reference image. The computing device 102 may be configured to determine the authenticity of the image 101 to be detected (such as determine the probability that the image to be detected is a synthesized image), based on the multiple feature representations determined at the block 220 and the additional feature representation determined here.

Referring to FIG. 4, the computing device 102 may be configured to process the image 101 to be detected using a filter designed in advance, to generate the filtered images 401, 402, and 403. The filtered images 401, 402, and 403 may be applied to additional feature representation determination models 411, 412, and 413, respectively to determine the additional feature representations. The authenticity evaluation model 420 may be configured to determine whether the target object 103 is a synthesized human face, based on the feature representations determined by the feature representation determination models 311-314 and the additional feature representations determined by the additional feature representation determination models 411-413.

One or more filters may be designed to perform noise extraction on the image 101 to be detected. In some embodiments, the image 101 to be detected may be processed by directly performing filtering (e.g., by using a convolution kernel designed in advance) on the spatial domain. For example, a spatial rich model (SRM) filter, a camera response coefficient, a texture filtering heat map, or the like may be used. Equation (1) gives three examples of the kernel of the SRM filter. In such an embodiment, by using the filter designed in advance, a possible means of faking of the image to be detected may be additionally determined.

$$\frac{1}{4}\begin{bmatrix} 0 & 0 & 0 & 0 & 0 \\ 0 & -1 & 2 & -1 & 0 \\ 0 & 2 & -4 & 2 & 0 \\ 0 & -1 & 2 & -1 & 0 \\ 0 & 0 & 0 & 0 & 0 \end{bmatrix} \quad (1)$$

$$\frac{1}{12}\begin{bmatrix} -1 & 2 & -2 & 2 & -1 \\ 2 & -6 & 8 & -6 & 2 \\ -2 & 8 & -12 & 8 & -2 \\ 2 & -6 & 8 & -6 & 2 \\ -1 & 2 & -2 & 2 & -1 \end{bmatrix} \frac{1}{2}\begin{bmatrix} 0 & 0 & 0 & 0 & 0 \\ 0 & 0 & 0 & 0 & 0 \\ 0 & 1 & -2 & 1 & 0 \\ 0 & 0 & 0 & 0 & 0 \\ 0 & 0 & 0 & 0 & 0 \end{bmatrix}$$

In some embodiments, the filtering process may be performed through transformations in spatial and frequency domains. For example, the image 101 to be detected may be solved from the spatial domain to the frequency domain using the Fourier transform to extract multiple frequency bands (for example, high frequency, intermediate frequency, and low frequency) in the frequency domain, and may be transformed to the spatial domain with the inverse Fourier transform. The filtered images obtained may be used as inputs of respective feature representation determination models.

It should be understood that, in such an embodiment, during the training of the additional feature representation determination models 411-413, the same filter or filtering means should be applied to the reference images used in training. It should also be understood that, in some embodiments, the above manner of directly performing filtering on the spatial domain and the manner of spatial-to-frequency domain transformation may be combined.

The following describes an example of acquiring the feature representation determination models 311-314, 411-413 and the authenticity evaluation models 320, 420 with reference to FIGS. 3 and 4. A set of reference images (also referred to as a set of training images) may be obtained. The set of reference images may include multiple reference images and authenticity information of the reference images. The set of reference images may include both real images and synthesized images. For example, the set of reference images may include real human face images and synthesized human face images. In the example of FIG. 3, the feature representation determination models 311-314 and the authenticity evaluation model 320 may be trained together. In the example of FIG. 4, the feature representation determination models 311-314, 411-413, and the authenticity evaluation model 420 are trained together.

For example, for a certain reference image, multiple intermediate reference images including different parts of the reference object may be generated based on the reference image. The process of generating the intermediate reference images is the same as the process of generating the intermediate images described above. The multiple intermediate reference images and the authenticity of the reference images may be used to train the multiple feature representation determination models. In the example of FIG. 3, the authenticity evaluation model 320 may be trained together. In the example of FIG. 4, the reference image may be filtered, and the filtered reference image may be used as an input to train the additional feature representation determination models 411-413 together with the feature representation determination models 311-314 and the authenticity evaluation model 420.

The processes of training models described above with reference to FIGS. 3 and 4 may be performed on the computing device 102, or on other computing devices. In the latter case, the computing device 102 may be configured to acquire and utilize the trained models to implement the solution for image detection according to embodiments of the present disclosure.

Figure 5:
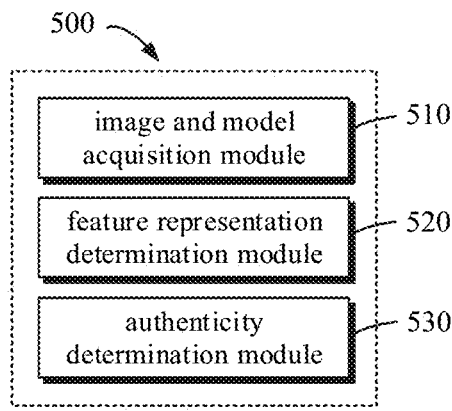
FIG. 5 is a schematic block diagram illustrating an image detection apparatus according to some embodiments of the present disclosure.

FIG. 5 is a schematic block diagram illustrating an image detection apparatus 500 according to embodiments of the present disclosure. The apparatus 500 may be included in or implemented as the computing device 102 of FIG. 1. As illustrated in FIG. 5, the apparatus 500 includes an image and model acquisition module 510. The image and model acquisition module 510 may be configured to acquire an image to be detected including a target object and acquire multiple feature representation determination models. The multiple feature representation determination models may be trained for different parts of a reference object by using a reference image including the reference object and an authenticity of the reference image. The apparatus 500 also includes a feature representation determination module 520. The feature representation determination module 520 may be configured to determine multiple feature representations for the different parts of the target object based on the image to be detected and the multiple feature representation determination models. The apparatus 500 may further include an authenticity determination module 530. The authenticity determination module 530 may be configured to determine authenticity of the image to be detected based on the multiple feature representations.

In some embodiments, the feature representation determination module 520 may include a key point determination module and a key point utilization module. The key point determination module may be configured to determine multiple sets of key points associated with the different parts of the image to be detected. The key point utilization module may be configured to determine the multiple feature representations based on the multiple sets of key points and the multiple feature representation determination models.

In some embodiments, the key point utilization module may include: an area determination module, an intermediate image generation module and an intermediate image application module. The area determination module may be configured to determine an area in which one of the multiple sets of key points are located from the image to be detected. The intermediate image generation module may be configured to generate an intermediate image based on the area. The intermediate image application module may be configured to determine the feature representation of a part corresponding to the one set of key points by applying the intermediate image to the feature representation determination model corresponding to the one set of key points.

In some embodiments, the authenticity determination module 530 may include a scoring module and a determination module. The scoring module may be configured to determine an authenticity score for a part corresponding to one of the multiple feature representations. The determination module may be configured to, in case that the authenticity score is lower than a predetermined threshold, determine that the part corresponding to the one feature representation is synthesized.

In some embodiments, the apparatus 500 may further include: a filtering module and an additional feature representation determination module. The filtering module may be configured to generate at least one filtered image by applying at least one filter to the image to be detected. The additional feature representation determination module may be configured to determine an additional feature representation for the image to be detected based on the at least one filtered image and an additional feature representation determination model. The additional feature representation determination model may be trained for the at least one filter by using the reference image and the authenticity of the reference image. The authenticity determination module 530 may include a probability determination module. The probability determination module may be configured to determine a probability that the image to be detected is generated by synthesis based on the multiple feature representations and the additional feature representations.

In some embodiments, the at least one filter may include multiple filters for different frequency ranges. The filtering module may include a filter application module. The filter application module may be configured to apply one of the multiple filters to the image to be detected, such that the filtered image generated only includes information of a frequency range corresponding to the filter.

In some embodiments, the image and model acquisition module 510 may include an intermediate reference image generation module and a model training module. The intermediate reference image generation module may be configured to generate multiple intermediate reference images including different parts of the reference object based on the reference images. The model training module may be configured to train the multiple feature representation determination modules by using the multiple intermediate reference images and the authenticity of the reference images.

In some embodiments, the authenticity determination module 530 may include an authenticity evaluation module. The authenticity evaluation module may be configured to determine the authenticity of the image to be detected by applying the multiple feature representations to an authenticity evaluation model. The authenticity evaluation model and the multiple feature representation determination models may be trained together using the reference images and the authenticity of the reference images.

Figure 6:
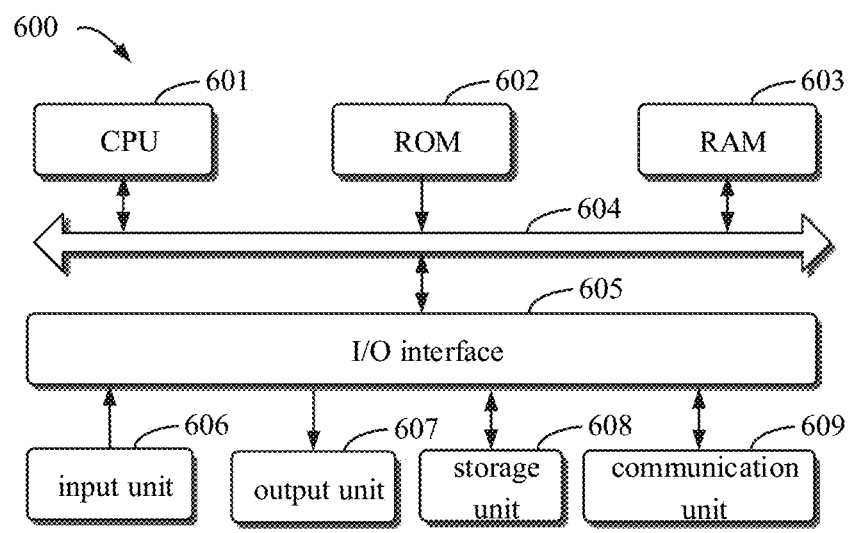
FIG. 6 is a block diagram illustrating a computing device capable of implementing various embodiments of the present disclosure.

FIG. 6 is a block diagram illustrating an example device 600 capable of implementing various embodiments of the present disclosure. The device 600 may be configured to implement the computing device 102 as illustrated in FIG. 1. As illustrated in FIG. 6, the device 600 includes a central processing unit (CPU) 601, which may perform various suitable actions and processes in accordance with computer program instructions stored in a read only memory (ROM) 602 or loaded from a storage unit 608 into a random access memory (RAM) 603. In the RAM 603, various programs and data necessary for operations of the device 600 may also be stored. The CPU 601, the ROM 602, and the RAM 603 are connected to each other through a bus 604. An input/output (I/O) interface 605 is also connected to the bus 604.

A number of components in the device 600 are connected to the I/O interface 605, including: an input unit 606 such as a keyboard, a mouse, and the like; an output unit 607 such as various types of displays, speakers, etc.; the storage unit 608 such as a magnetic disk, an optical disk, or the like; and a communication unit 609 such as a network card, a modem, a wireless communication transceiver, and so on. The communication unit 609 allows the device 600 to exchange information/data with other devices via a computer network such as the Internet and/or various telecommunications networks.

The processing unit 601 performs the various methods and processes described above, such as the process 200. For example, in some embodiments, the process 200 may be implemented as a computer software program tangibly embodied on a machine-readable medium, such as the storage unit 608. In some embodiments, some or all of the computer programs may be loaded and/or installed onto the device 600 via the ROM 602 and/or the communication unit 609. When a computer program is loaded onto the RAM 603 and executed by the CPU 601, one or more steps in the process 200 described above may be performed. Alternatively, in other embodiments, the CPU 601 may be configured to perform any one of the process 200 in any other suitable manner (e.g., by way of the firmware).

The functions described herein above may be performed, at least in part, by one or more hardware logic components. For example, and without limitation, exemplary types of the hardware logic components that may be used include: a field programmable gate array (FPGA), an application specific integrated circuit (ASIC), an application specific standard product (ASSP), a system on chip (SOC), a complex programmable logic device (CPLD), and the like.

Program codes for performing the method in the present disclosure may be written in any combination of one or more programming languages. These program codes may be provided to a processor or controller in a general-purpose computer, a special purpose computer, or other programmable data processing devices, such that the program codes, when executed by the processor or controller, are configured to implement functions/operations specified in the flow chart and/or block diagrams. The program code may be executed entirely on a machine, partly on the machine, as a separate software package, partly on the machine, partly on a remote computer, or entirely on the remote computer or server.

In the context of the present disclosure, the machine-readable medium may be a tangible medium that may contain, or store a program for use by or in combination with an instruction execution system, an apparatus, or a device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of the machine-readable storage medium may include: an electrical connection having one or more wires, a portable computer disk, a hard disk, a random access memory (RAM), a read only memory (ROM), an Erasable Programmable Read Only Memory (EPROM or a flash memory), an optical fiber, a compact disc read-only memory (CD-ROM), an optical memory component, a magnetic memory component, or any suitable combination thereof.

Moreover, while operations are described in a particular order, this should be understood as that the operations are required to be performed in a particular illustrated order or in a sequential order, or that all illustrated operations are required to be performed to achieve desirable results. In certain circumstances, multitasking and parallel processing may be advantageous. Likewise, while several specific implementation details are included in the above discussion, these should not be construed as limiting the scope of the present disclosure. Certain features described in the context of separate embodiments may also be implemented in combination in a single implementation. Conversely, features that are described in the context of the single implementation may also be implemented in a plurality of implementations separately or in any suitable sub-combination.

Although the subject matter has been described in a language specific to structural features and/or methodological acts, it is to be understood that the subject matter defined in the attached claims is not necessarily limited to the specific features or acts described above. Instead, the specific features and acts described above are merely exemplary forms for implementing the attached claims.

What is claimed is:

1. A method for detecting an image, comprising:
acquiring an image to be detected comprising a target object and acquiring a plurality of feature representation determination models, wherein the plurality of feature representation determination models are trained for different parts of a reference object by using a reference image comprising the reference object and an authenticity of the reference image;
determining a plurality of feature representations for different parts of the target object based on the image to be detected and the plurality of feature representation determination models; and
determining an authenticity of the image to be detected based on the plurality of feature representations;
wherein determining the plurality of feature representations comprises:
determining a plurality of sets of key points associated with the different parts, from the image to be detected; and
determining the plurality of feature representations based on the plurality of sets of key points and the plurality of feature representation determination models;
wherein determining the plurality of feature representations based on the plurality of sets of key points and the plurality of feature representation determination models comprises:
determining an area in which one set of the plurality of sets of key points are located, from the image to be detected;
generating an intermediate image based on the area by highlighting the area and blurring other areas in the image to be detected; and
determining a feature representation of a part corresponding to the one set of key points by applying the intermediate image to the feature representation determination model corresponding to the one set of key points.

2. The method of claim 1, wherein determining the authenticity of the image to be detected comprises:
determining an authenticity score for a part corresponding to one of the plurality of feature representations; and
in response to that the authenticity score is lower than a predetermined threshold, determining that the part corresponding to the one feature representation is generated by synthesis.

3. The method of claim 1, further comprising:
generating at least one filtered image by applying at least one filter to the image to be detected; and
determining an additional feature representation for the image to be detected based on the at least one filtered image and an additional feature representation determination model, wherein the additional feature representation determination model is trained for the at least one filter, using the reference image and the authenticity of the reference image; and
wherein determining the authenticity of the image to be detected comprises:
determining a probability that the image to be detected is generated by synthesis based on the plurality of feature representations and the additional feature representation.

4. The method of claim 3, wherein the at least one filter comprises a plurality of filters for different frequency ranges, and generating the at least one filtered image comprises:
applying one of the plurality of filters to the image to be detected, such that the filtered image generated comprises information of a frequency range corresponding to the one filter.

5. The method of claim 1, wherein acquiring the plurality of feature representation determination models comprises:
generating a plurality of intermediate reference images corresponding to different parts of the reference object, based on the reference image; and
training the plurality of feature representation determination models, using the plurality of intermediate reference images and the authenticity of the reference image.

6. The method of claim 1, wherein determining the authenticity of the image to be detected comprises:
determining the authenticity of the image to be detected by applying the plurality of feature representations to an authenticity evaluation model, wherein the authenticity evaluation model and the plurality of feature representation determination models are trained together, using the reference image and the authenticity of the reference image.

7. The method of claim 1, further comprising:
enlarging the intermediate image to a specified size.

8. The method of claim 1, wherein the highlighted area locates at center of the intermediate image.

9. An electronic device, comprising:
one or more processors; and
a storage device, configured to store one or more programs, wherein when the one or more programs are executed by the one or more processors, the one or more processors are caused to:
acquire an image to be detected comprising a target object and acquire a plurality of feature representation determination models, wherein the plurality of feature representation determination models are trained for different parts of a reference object by using a reference image comprising the reference object and an authenticity of the reference image;
determine a plurality of feature representations for different parts of the target object based on the image to be detected and the plurality of feature representation determination models; and
determine an authenticity of the image to be detected based on the plurality of feature representations;
wherein the one or more processors are caused to determine the plurality of feature representations by:
determining a plurality of sets of key points associated with the different parts, from the image to be detected; and
determining the plurality of feature representations based on the plurality of sets of key points and the plurality of feature representation determination models;
wherein the one or more processors are caused to determine the plurality of feature representations based on the plurality of sets of key points and the plurality of feature representation determination models by:
determining an area in which one set of the plurality of sets of key points are located, from the image to be detected;
generating an intermediate image based on the area; and
determining a feature representation of a part corresponding to the one set of key points by applying the intermediate image to the feature representation determination model corresponding to the one set of key points.

10. The electronic device of claim 9, wherein the one or more processors are caused to determine the authenticity of the image to be detected by:
determining an authenticity score for a part corresponding to one of the plurality of feature representations; and
in response to that the authenticity score is lower than a predetermined threshold, determining that the part corresponding to the one feature representation is generated by synthesis.

11. The electronic device of claim 9, wherein the one or more processors are caused to further:
generate at least one filtered image by applying at least one filter to the image to be detected; and determine an additional feature representation for the image to be detected based on the at least one filtered image and an additional feature representation determination model, wherein the additional feature representation determination model is trained for the at least one filter, using the reference image and the authenticity of the reference image; and
the one or more processors are caused to determine the authenticity of the image to be detected by:
determining a probability that the image to be detected is generated by synthesis based on the plurality of feature representations and the additional feature representation.

12. The electronic device of claim 11, wherein at least one filter comprises a plurality of filters for different frequency ranges, and the one or more processors are caused to generate the at least one filtered image by:
applying one of the plurality of filters to the image to be detected, such that the filtered image generated comprises information of a frequency range corresponding to the one filter.

13. The electronic device of claim 9, wherein the one or more processors are caused to acquire the plurality of feature representation determination models by:
generating a plurality of intermediate reference images corresponding to different parts of the reference object, based on the reference image; and
training the plurality of feature representation determination models, using the plurality of intermediate reference images and the authenticity of the reference image.

14. The electronic device of claim 9, wherein the one or more processors are caused to determine the authenticity of the image to be detected by:
determining the authenticity of the image to be detected by applying the plurality of feature representations to an authenticity evaluation model, wherein the authenticity evaluation model and the plurality of feature representation determination models are trained together, using the reference image and the authenticity of the reference image.

15. The electronic device of claim 9, wherein the one or more processors are caused to further:
enlarge the intermediate image to a specified size.

16. The electronic device of claim 9, wherein the highlighted area locates at center of the intermediate image.

17. A non-transitory computer-readable storage medium having a computer program stored thereon, wherein when the program is executed by a processor, the processor is configured to implement a method for detecting an image, the image method comprises:
acquiring an image to be detected comprising a target object and acquiring a plurality of feature representation determination models, wherein the plurality of feature representation determination models are trained for different parts of a reference object by using a reference image comprising the reference object and an authenticity of the reference image;
determining a plurality of feature representations for different parts of the target object based on the image to be detected and the plurality of feature representation determination models; and
determining an authenticity of the image to be detected based on the plurality of feature representations;
wherein determining the plurality of feature representations comprises:
determining a plurality of sets of key points associated with the different parts, from the image to be detected; and
determining the plurality of feature representations based on the plurality of sets of key points and the plurality of feature representation determination models;
wherein determining the plurality of feature representations based on the plurality of sets of key points and the plurality of feature representation determination models comprises:
determining an area in which one set of the plurality of sets of key points are located, from the image to be detected;
generating an intermediate image based on the area by highlighting the area and blurring other areas in the image to be detected; and
determining a feature representation of a part corresponding to the one set of key points by applying the intermediate image to the feature representation determination model corresponding to the one set of key points.

18. The non-transitory computer-readable storage medium of claim 17, wherein determining the authenticity of the image to be detected comprises:
determining an authenticity score for a part corresponding to one of the plurality of feature representations; and
in response to that the authenticity score is lower than a predetermined threshold, determining that the part corresponding to the one feature representation is generated by synthesis.

19. The non-transitory computer-readable storage medium of claim 17, wherein the method further comprising enlarging the intermediate image to a specified size.

20. The non-transitory computer-readable storage medium of claim 17, wherein the highlighted area locates at center of the intermediate image.

* * * * *